(12) United States Patent
Walling et al.

(10) Patent No.: US 9,164,122 B2
(45) Date of Patent: Oct. 20, 2015

(54) DUAL OUTPUT ACCELEROMETER SYSTEM

(75) Inventors: Paul Walling, Hampshire (GB); David Yeomans, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 442 days.

(21) Appl. No.: 13/546,328

(22) Filed: Jul. 11, 2012

(65) Prior Publication Data
US 2013/0014586 A1    Jan. 17, 2013

(30) Foreign Application Priority Data

Jul. 12, 2011  (GB) .................................. 1111952.6

(51) Int. Cl.
G01P 15/09       (2006.01)
(52) U.S. Cl.
CPC .................................. G01P 15/0907 (2013.01)
(58) Field of Classification Search
USPC ................... 73/514.34, 514.16, 549; 310/329
See application file for complete search history.

(56) References Cited

U.S. PATENT DOCUMENTS

| | | | | |
|---|---|---|---|---|
| 3,727,084 A | * | 4/1973 | Epstein | 310/329 |
| 4,052,628 A | * | 10/1977 | Hayer | 310/333 |
| 4,213,114 A | * | 7/1980 | Cochard | 340/945 |
| 4,586,377 A | * | 5/1986 | Schmid | 73/514.34 |
| 5,117,696 A | * | 6/1992 | Schmid | 73/514.34 |
| 5,212,984 A | | 5/1993 | Norling et al. | |
| 5,388,459 A | * | 2/1995 | Inoue et al. | 73/514.34 |
| 6,021,671 A | * | 2/2000 | Kami et al. | 73/514.34 |
| 6,397,677 B1 | * | 6/2002 | Kinsley et al. | 73/514.34 |
| 6,655,211 B1 | * | 12/2003 | Schmid et al. | 73/514.34 |

FOREIGN PATENT DOCUMENTS

| | | |
|---|---|---|
| WO | 0194953 A2 | 12/2001 |
| WO | 2011113625 A1 | 9/2011 |

OTHER PUBLICATIONS

Search Report dated Oct. 14, 2011 for related Application No. GB 1111952.6.

* cited by examiner

*Primary Examiner* — Hezron E Williams
*Assistant Examiner* — Xin Zhong
(74) *Attorney, Agent, or Firm* — Fredrikson & Byron, P.A.

(57) ABSTRACT

There is disclosed a dual output compressive mode accelerometer having first and second output channels, comprising:
  a supporting base;
  first and second transducers mounted on the supporting base adjacent to one another, each transducer comprising a piezoelectric element and a seismic mass, the piezoelectric element positioned between the supporting base and the seismic mass; and
  a rigid mechanical coupling between the first and second transducers, the rigid mechanical coupling coupled to both of the first and second transducers above the supporting base.

22 Claims, 7 Drawing Sheets

DUAL OUTPUT ACCELEROMETER SYSTEM

FIELD OF THE INVENTION

The present invention relates to a dual accelerometer which comprises two (or more) transducers, each providing an output.

BACKGROUND OF THE INVENTION

Accelerometers are used for measuring vibrations in machines, such as gas turbines or jet engines. In aircraft engines there is a requirement for redundancy in almost all components, including monitoring equipment. It is therefore known to provide dual accelerometers, so that should one accelerometer fail, the other can be switched in to provide the necessary information to the engine control system.

One form of an accelerometer used in gas turbine engines comprises a piezoelectric crystal stack held on a pre-tensioned rod between a supporting base and a seismic mass. The sensor works by providing electrical signals indicative of the compression of the piezoelectric stack between the seismic mass and the supporting base.

A dual output accelerometer of this type is disclosed in U.S. Pat. No. 4,586,377. U.S. Pat. No. 4,586,377 describes a system in which two piezoelectric crystal stacks are located on a single pre-tensioned bolt, to provide two output channels. This system suffers from the problem that if one crystal stack breaks or crumbles, both signals are greatly reduced or lost. Also, if the pre-tensioned central rod breaks, both signals are lost.

Another problem with this type of accelerometer system is that when in an environment in which there are significant transverse vibrations, the output signals can be significantly distorted to the point where they are no longer useful. Furthermore, the pre-tensioned rod may fail. This is the case where the two accelerometers are placed on a single rod one above the other, or if they are placed side by side. If two accelerometers are placed side by side, when one accelerometer fails, it is quite likely that the other will also fail, as they are both subject to substantially the same conditions.

It is an object of the invention to provide a dual channel accelerometer that is more reliable under transverse vibrations. It is a particular object to provide an accelerometer that is more reliable under the conditions typically found in an aircraft gas turbine engine.

SUMMARY OF THE INVENTION

The invention is defined in the appended independent claims, to which reference should be made. Preferred features are set out in the dependent claims.

In a first aspect, the invention provides a dual output compressive mode accelerometer having first and second output channels, comprising:
  a supporting base;
  first and second transducers mounted on the supporting base adjacent to one another, each transducer comprising a piezoelectric element and a seismic mass, the piezoelectric element positioned between the supporting base and the seismic mass; and
  a rigid mechanical coupling between the first and second transducers, the rigid mechanical coupling coupled to both of the first and second transducers above the supporting base.

By coupling the two transducers together above the supporting base e.g. at the top or middle of the accelerometer stacks, the resonant frequency of the accelerometer assembly in the transverse mode is significantly increased and can be increased to a value outside the normal operating frequency of a gas turbine engine. "Transverse" in this context means transverse to a transducer axis, where the axis passes through the supporting base, the piezoelectric element and the corresponding seismic mass. The transducer axis corresponds to the direction of sensitivity of the accelerometer.

The first and second output channels are connected to the first and second piezoelectric elements respectively.

Each of the two transducers may share the same seismic mass, with the shared seismic mass forming the rigid mechanical coupling between the first and second transducers.

Alternatively, the first and second transducers may each have a separate seismic mass and the rigid mechanical coupling may be a bracing element coupled to both seismic masses or to another part of each transducer. For example, the bracing element may be coupled to a pre-tensioned rod or bolt running through each transducer in an axial direction.

The accelerometer may further comprise a casing fixed to the supporting base. The bracing element may be coupled to the casing. The bracing element may be coupled to the casing at a number of points on the casing so that movement of the transducers is substantially prevented in all transverse directions. This allows two output channels to be maintained when the sensor is subject to high transverse loads or vibrations. Alternatively, or in addition, the bracing element may be rigidly fixed to the supporting base, for example by one or more rigid pins.

The bracing element may be formed from a solid piece of material or made up of multiple layers of thinner material.

In embodiments in which the first and second transducers share a single seismic mass, a bracing element may be provided in addition and may be coupled to a casing.

Preferably each transducer assembly further includes a pre-tensioned bolt, to which the piezoelectric elements and the seismic mass or masses are coupled. The rigid mechanical coupling may be connected to each bolt.

In a second aspect of the invention, there is provided a dual output compressive mode accelerometer having first and second output channels, comprising a supporting base, first and second piezoelectric elements mounted on the supporting base adjacent to one another and a seismic mass coupled to both of the piezoelectric elements such that the piezoelectric elements are positioned between the seismic mass and the supporting base.

The first and second output channels are preferably connected to the first and second piezoelectric elements respectively.

The output from each transducer output channel can be tuned to ensure identical output from each channel when subjected to the same input vibration or loading conditions.

It is of course possible to have more than two output channels and more than two piezoelectric elements. The inventions can be extended to as many output channels as required, with the transducers each coupled to one other transducer by a rigid coupling.

In accordance with a further aspect of the invention, there is provided a gas turbine engine comprising a dual output accelerometer in accordance with either of the preceding aspects of the invention, and an engine control system connectable to both output channels of the dual output accelerometer.

BRIEF DESCRIPTION OF THE DRAWINGS

Embodiments of the invention will now be described in detail, by way of example only, with reference to the accompanying drawings, in which:

FIG. 1b is a schematic plan view of the embodiment of FIG. 1a;

FIG. 2b is a schematic plan view of the embodiment of FIG. 2a;

FIG. 3b is a schematic plan view of the embodiment of FIG. 3a;

FIG. 4b is a schematic plan view of the embodiment of FIG. 4a;

FIG. 5b is a schematic plan view of the embodiment of FIG. 5a;

FIG. 6b is a schematic plan view of the embodiment of FIG. 6a;

FIG. 7b is a schematic plan view of the embodiment of FIG. 7a.

DETAILED DESCRIPTION

Figure 1B:
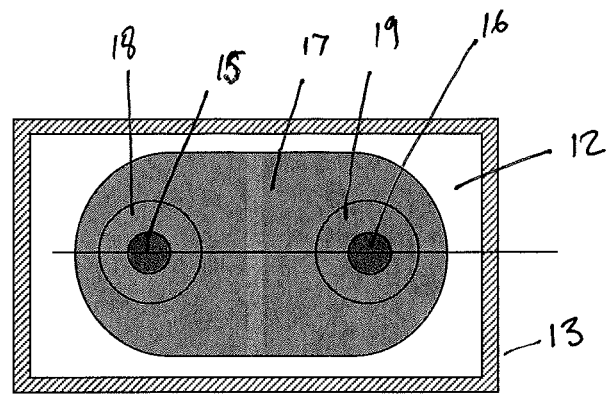
Figure 1A:
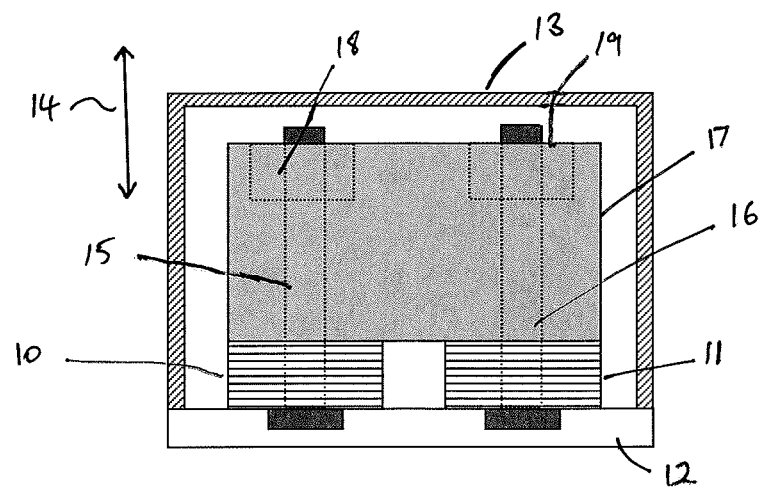
FIG. 1a is a schematic cross sectional view of a first embodiment of the invention.

FIG. 1a illustrates the basic elements of a first embodiment of a dual output accelerometer in accordance with the invention. The accelerometer comprises two piezoelectric crystal stacks 10, 11 arranged side by side on a solid supporting base 12. The piezoelectric crystal stacks 10, 11 are mounted on tensioning bolts 15, 16 fixed to the support surface 12. Mounted on the tensioning bolts above the piezoelectric elements is a single seismic mass 17. Nuts 18, 19 are provided at the top of the tensioning bolts to securely fix the seismic mass above the piezoelectric crystal stacks. An outer casing 13 is provided to protect the accelerometer assembly.

FIG. 1b is a plan view of the embodiment shown in FIG. 1a.

Instead of pre-tensioned bolts 15, 16, the components of the transducers may be welded, glued or fastened to one another in any other suitable way. The casing 13 is welded to the supporting base 12, but may also be fixed in another suitable way.

Under the action of vibrations in the direction of the sensitive axis (indicated by arrow 14) the seismic mass generates compression and decompression forces on the piezoelectric elements 10, 11. The piezoelectric elements then produce an electrical signal representative of the compression and decompression which can be transmitted to output channels.

Under the action of vibrations in directions perpendicular to the sensitive axis, which are referred to herein as transverse directions, the piezoelectric elements 10, 11 experience bending stresses. The bending stresses lead to a distortion of the signals output to the output channels, particularly when the frequency of vibration coincides with the transverse resonant frequency of the accelerometer assembly.

In the embodiment of FIGS. 1a and 1b, the seismic mass 17 forms part of both transducer assemblies and at the same time ties the two assemblies together to provide structural rigidity. This provides a much higher transverse resonant frequency than would be the case if there were two separate seismic masses, one coupled to each pre-tensioned bolt, but not coupled to one another. By coupling the transducers in this way, the transverse resonant frequency of the accelerometer can be made much higher than the typical frequency experienced in, for example, a gas turbine engine on an aircraft.

Figure 2B:
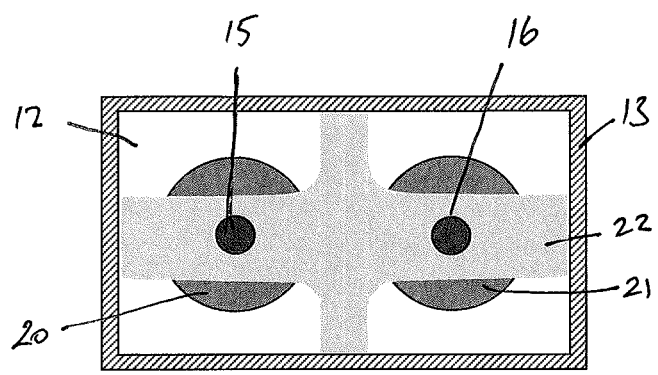
Figure 2A:
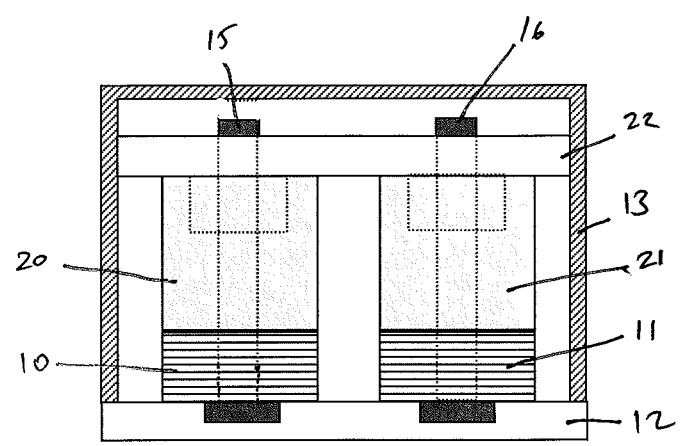
FIG. 2a is a schematic cross sectional view of a second embodiment of the invention.

FIG. 2a illustrates an alternative embodiment. In the embodiment of FIG. 2a each transducer has a separate seismic mass 20, 21 but a bracing member 22 is provided to connect the two adjacent transducer stacks. The bracing element 22 is coupled to the seismic masses 20, 21 at the top end, above the tensioning nuts 18, 19. The bracing element 22 is also fixed to the outer casing 13.

The bracing member 22 provides for an increase in the transverse resonant frequency of the accelerometer assembly in the same manner as the shared seismic mass of the embodiment shown in FIGS. 1a and 1b. The bracing member in this example is formed of spring steel but may be formed on other suitably rigid materials, such as stainless steel or Inconel® alloys. The bracing member may be formed from a single component or may be formed from a plurality of components layered together or otherwise joined. The bracing may also be corrugated to provide stiffness in the transverse direction and flexibility in the axial direction FIG. 2b is a plan view of the embodiment shown in FIG. 2a. As can been seen from FIG. 2b the bracing element 22 is fixed to the casing 13 on each side so as substantially to prevent transverse motion of the seismic masses 20, 21 in all transverse directions. This further reduces the distorting effect of transverse vibration on the output signals.

The bracing member 22 is fixed to the housing by welded or brazed joints and to the seismic masses 20, 21 by welded joints.

Figure 3B:
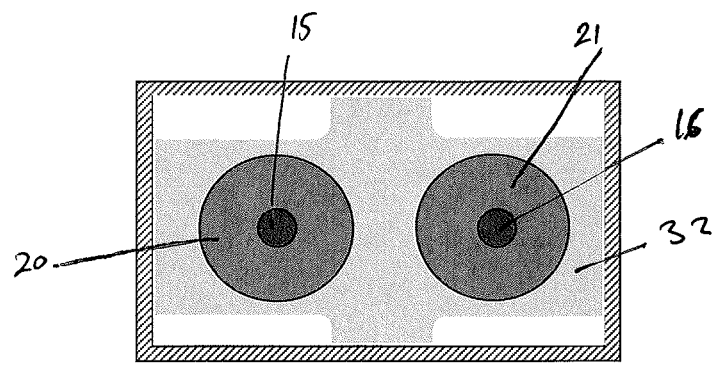
Figure 3A:
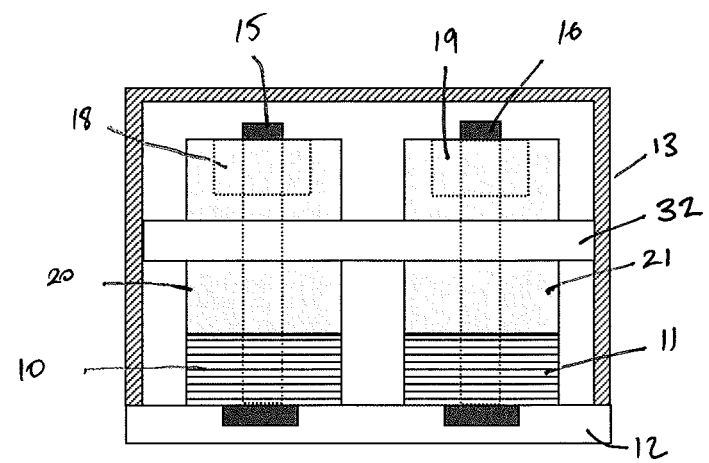
FIG. 3a is a schematic cross sectional view of a third embodiment of the invention.

FIG. 3a illustrates a third embodiment of the present invention. The third embodiment is the same as the second embodiment of the invention, except that the bracing element 32 is provided at around the midpoint of the seismic masses 20, 21 and is of a slightly different shape. FIG. 3b is a plan view of the embodiment shown in FIG. 3a and it can be seen from FIG. 3b that the bracing element 32 is coupled to the outer casing 13 on all four sides, to prevent transverse movement in all directions. The joints of the bracing element 32 with the casing 13 are more extensive than in the second embodiment. The bracing element may be fixed to the seismic masses by any suitable means, in this example welding.

Figure 4B:
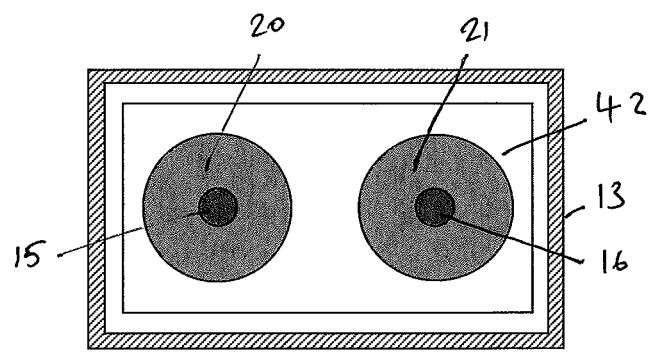
Figure 4A:
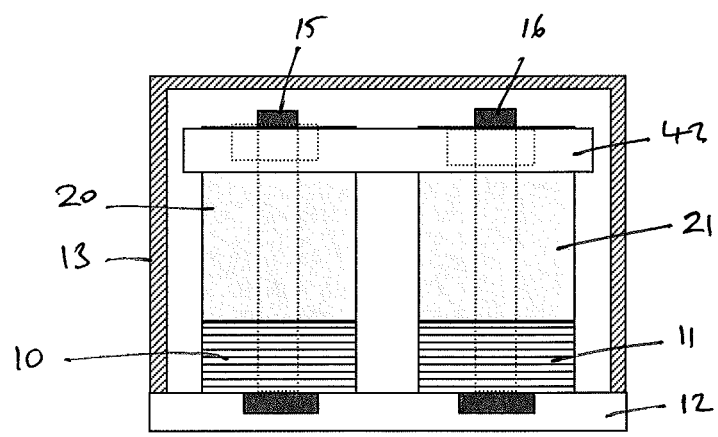
FIG. 4a is a schematic cross sectional view of a fourth embodiment of the invention.

FIG. 4a is a fourth embodiment of the present invention. The fourth embodiment is the same as the second embodiment of the invention, except that the bracing element 42 is not connected to the casing 13, as can be seen from FIG. 4b, and is of a different shape.

Figure 5B:
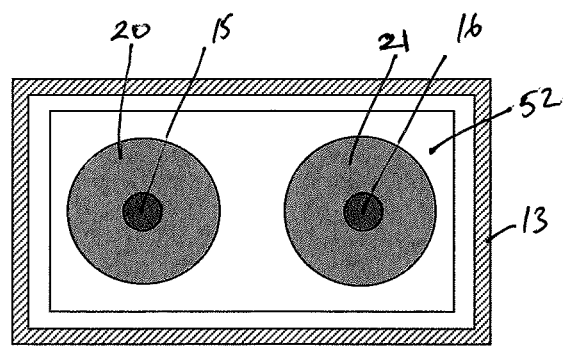
Figure 5A:
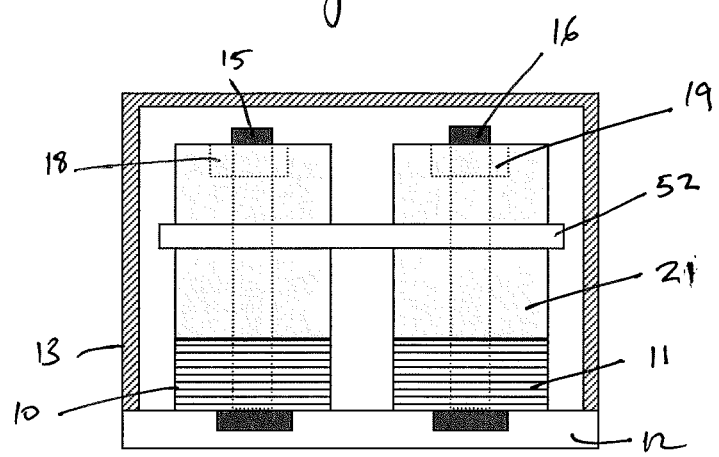
FIG. 5a is a schematic cross sectional view of a fifth embodiment of the invention.

FIG. 5a illustrates a fifth embodiment of the present invention. The fifth embodiment is the same as the third embodiment of the invention, except that the bracing element 52 is not connected to the casing 13, as can be seen from FIG. 5b, and is of a different shape.

Figure 6B:
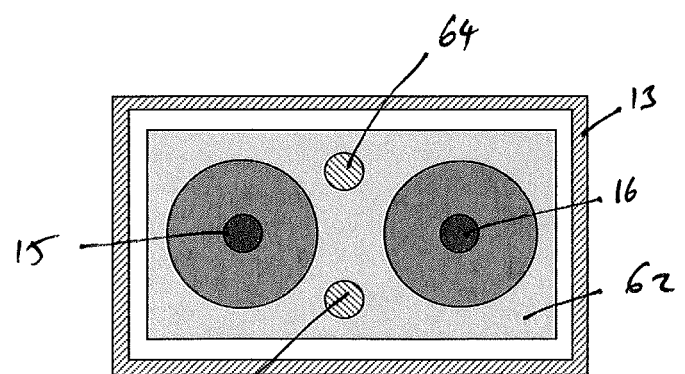
Figure 6A:
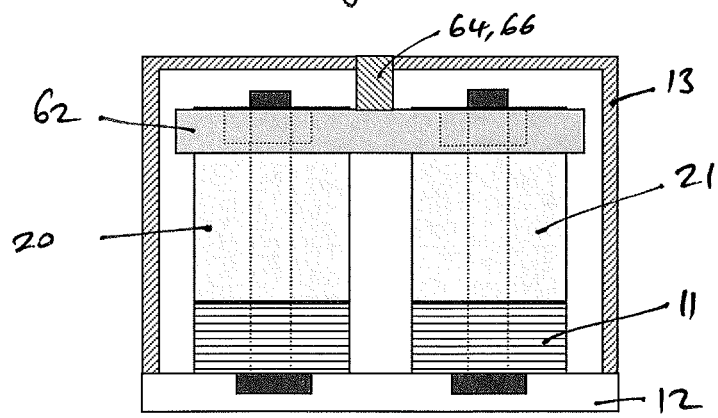
FIG. 6a is a schematic cross sectional view of a sixth embodiment of the invention.

FIG. 6a illustrates a sixth embodiment of the invention. The sixth embodiment is the same as the fourth embodiment in most respects. However, in the embodiment of FIG. 6a, the bracing element 62 is fixed to a top surface of the casing 13 by a pair of welded pins 64, 66. FIG. 6b is a plan view of the sixth embodiment illustrating possible positions for the pins.

Figure 7B:
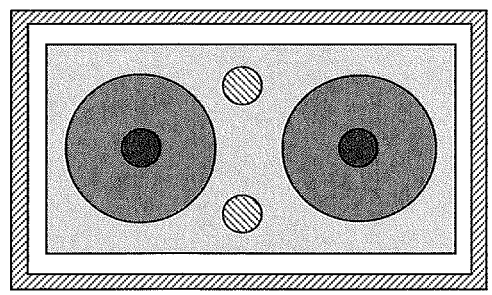
Figure 7A:
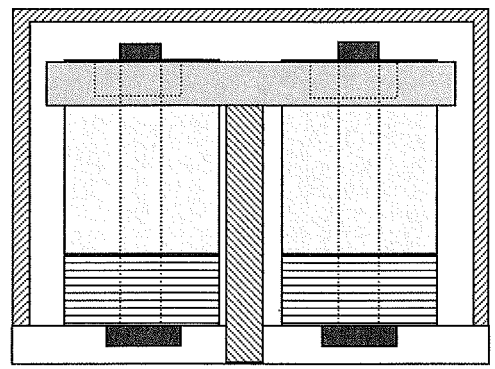
FIG. 7a is a schematic cross sectional view of a seventh embodiment of the invention.

FIG. 7a illustrates a seventh embodiment of the invention. The seventh embodiment is the same as the sixth embodiment except that the bracing element 72 is fixed to base 12 by a pair of welded pins 74, 76, rather than to the casing 13. FIG. 7b is a plan view of the seventh embodiment illustrating possible positions for the pins.

The same or similar materials may be used in all of the described embodiments for the various components. The supporting base 12 may be formed from an alloy such as Inconel® alloy 600 or Inconel® alloy 625 and the casing may be formed or stainless steel. But the materials chosen will depend on the operating environment for the accelerometer and their compatibility. Suitable materials for the tensioning bolts 15, 16 are Titanium and Inconel® alloy 718. The piezoelectric elements may be formed of a natural material such as quartz or Tourmaline, a man-made quartz such as Langatate, or a man-made polycrystalline material such as Bismuth Titanate. The seismic masses may be formed or Tungsten or any other suitable high density material. The bracing member may be formed of spring steel or other suitably rigid materials, such as stainless steel or Inconel® alloys.

It is also possible to use a single seismic mass as shown in FIGS. 1a and 1b but fixing the seismic mass to the housing to provide off-axis stabilisation. This can be done by directly coupling the seismic mass to the housing or by using a bracing element as shown in FIGS. 2a and 2b for example.

The invention claimed is:

1. A dual output compressive mode accelerometer having first and second output channels, comprising:
    a supporting base;
    first and second transducers mounted on the supporting base adjacent to one another, each transducer comprising a seismic mass and a piezoelectric element connected to one of the output channels, wherein the piezoelectric element is positioned between the supporting base and the seismic mass; and
    a rigid mechanical coupling between the first and second transducers, the rigid mechanical coupling coupled to both of the first and second transducers above the supporting base, wherein, the dual output channels include two distinct and independent output channels.

2. A dual output accelerometer according to claim 1, wherein the first and second output channels are connected to first and second of the piezoelectric elements respectively.

3. A dual output accelerometer according to claim 1, wherein outputs from the first and second output channels are tuned to ensure identical output from each channel when subjected to the same input vibration or loading conditions.

4. A gas turbine engine comprising a dual output accelerometer in accordance with claim 1 and an engine control system connectable to both output channels of the dual output accelerometer.

5. A dual output compressive mode accelerometer according to claim 1, wherein the first transducer is configured to provide an output signal to a first of the output channels and the second transducer is configured provide an independent output signal to a second of the output channels.

6. A dual output accelerometer according to claim 1, wherein the first and second transducers each comprise a separate seismic mass, and wherein the rigid mechanical coupling is a bracing element coupled between the first transducer and the second transducer.

7. A dual output accelerometer according to claim 6, wherein the bracing element is formed from a plurality of components.

8. A dual output accelerometer according to claim 1, wherein the first and second transducers share a single seismic mass, wherein the seismic mass forms the rigid mechanical coupling between the first and second transducers.

9. A dual output accelerometer according to claim 8, further comprising a bracing element coupled to the first and second transducers.

10. A dual output accelerometer according to claim 1, wherein each transducer further comprises a pre-tensioned bolt to which the piezoelectric element and the seismic mass are coupled.

11. A dual output accelerometer according to claim 10, wherein the rigid mechanical coupling is connected to each bolt.

12. A dual output accelerometer according to claim 1, further comprising a casing fixed to the supporting base.

13. A dual output accelerometer according to claim 12, wherein the rigid mechanical coupling is a bracing element, and wherein the bracing element is fixed to the casing or to the supporting base.

14. A dual output accelerometer according to claim 13 wherein the bracing element is fixed to the casing at a plurality of points on the casing so that movement of the transducers is substantially prevented in all transverse directions.

15. A dual output compressive mode accelerometer having first and second output channels, comprising a supporting base, first and second piezoelectric elements mounted on the supporting base adjacent to one another and a seismic mass coupled to both of the piezoelectric elements such that the piezoelectric elements are positioned between the seismic mass and the supporting base, wherein, each piezoelectric element is connected to one of the output channels and the output channels include two distinct and independent output channels.

16. A dual output accelerometer according to claim 15, wherein the first and second piezoelectric elements are mounted on first and second pre-tensioned bolts respectively, and wherein the seismic mass is coupled to both the first and second pre-tensioned bolts.

17. A dual output accelerometer according to claim 15, further comprising a casing fixed to the supporting base, wherein the seismic mass is fixed directly to the casing or to the supporting base.

18. A dual output accelerometer according to claim 17, wherein the seismic mass is fixed to the casing at a plurality of points on the casing.

19. A dual output compressive mode accelerometer comprising:
    a supporting base;
    first and second transducers mounted on first and second pre-tensioned bolts fixed to the supporting base adjacent to one another, each transducer comprising a piezoelectric element and a seismic mass, and
    first and second output channels connected to the first and second transducers respectively, wherein the first and second transducers are rigidly coupled to one another above the supporting base, wherein, the dual output channels include two distinct and independent output channels.

20. A dual output compressive mode accelerometer according to claim 19, wherein the first and second transducers are rigidly coupled to a casing, the casing being fixed to the supporting base and surrounding the first and second transducers.

21. A dual output compressive mode accelerometer according to claim 19, wherein the first and second transducers rigidly coupled to one another by a shared seismic mass.

22. A dual output compressive mode accelerometer according to claim 19, wherein the first transducer is configured to provide an output signal to the first output channel and the second transducer is configured provide an independent output signal to the second output channel.

* * * * *